United States Patent [19]

Stern

[11] 4,310,978

[45] Jan. 19, 1982

[54] ADVERTISING AND PROMOTIONAL DISPLAY MATERIALS

[75] Inventor: Larry Stern, Wilmette, Ill.

[73] Assignee: American Printers & Lithographers, Inc., Chicago, Ill.

[21] Appl. No.: 104,871

[22] Filed: Dec. 18, 1979

[51] Int. Cl.³ .............................................. G09F 7/04
[52] U.S. Cl. .................................... 40/600; 40/10 R; 156/73.3
[58] Field of Search ............... 40/600, 615, 621, 10 R, 40/10 D, 405, 10 B; 428/900; 156/580.2, 580.1, 515, 73.3

[56] References Cited

U.S. PATENT DOCUMENTS

| | | | |
|---|---|---|---|
| 2,925,675 | 2/1960 | Lumpkin | 40/10 D |
| 3,124,501 | 3/1964 | Wise | 40/600 X |
| 3,221,428 | 12/1965 | Fischler et al. | 40/2.2 |
| 3,237,327 | 3/1966 | Griggs | 40/600 X |
| 3,698,111 | 10/1972 | Smith | 40/600 X |
| 3,826,026 | 7/1974 | Bevan | 40/600 X |
| 3,943,645 | 3/1976 | Viesturs | 40/10 D |

FOREIGN PATENT DOCUMENTS

| | | | |
|---|---|---|---|
| 675902 | 10/1963 | Canada | 40/10 D |
| 1201051 | 12/1959 | France | 40/593 |

Primary Examiner—Gene Mancene
Assistant Examiner—G. Lee Skillington
Attorney, Agent, or Firm—James T. FitzGibbon

[57] ABSTRACT

An article for displaying advertising or promotional materials. In the preferred form, the article comprises a mounting portion including a body of an elastomeric material having embedded therein a plurality of magnetic particles, thereby rendering the mounting portion capable of being adhered to a magnetically permeable substrate. The body has a rear surface portion adapted to be received over the substrate, an oppositely directed front surface portion, and an intermediate opaque sheet of a thermoplastic material bonded by a pressure-sensitive adhesive to said front surface portion of the body. A cover sheet closely overlies the intermediate sheet, and the intermediate sheet and the outer sheet have their respective peripheral edges bonded to each other by a fused, adhesiveless bond about at least a substantial portion of the periphery of the article. In one form, an envelope is provided, and in another form, the cover sheet is transparent and a display image is lithographed on the inner surface of the cover sheet. A method of forming the article is described; the method includes simultaneously die-cutting articles and fusing certain portions of their edges together to form the final product.

7 Claims, 8 Drawing Figures

U.S. Patent   Jan. 19, 1982   4,310,978
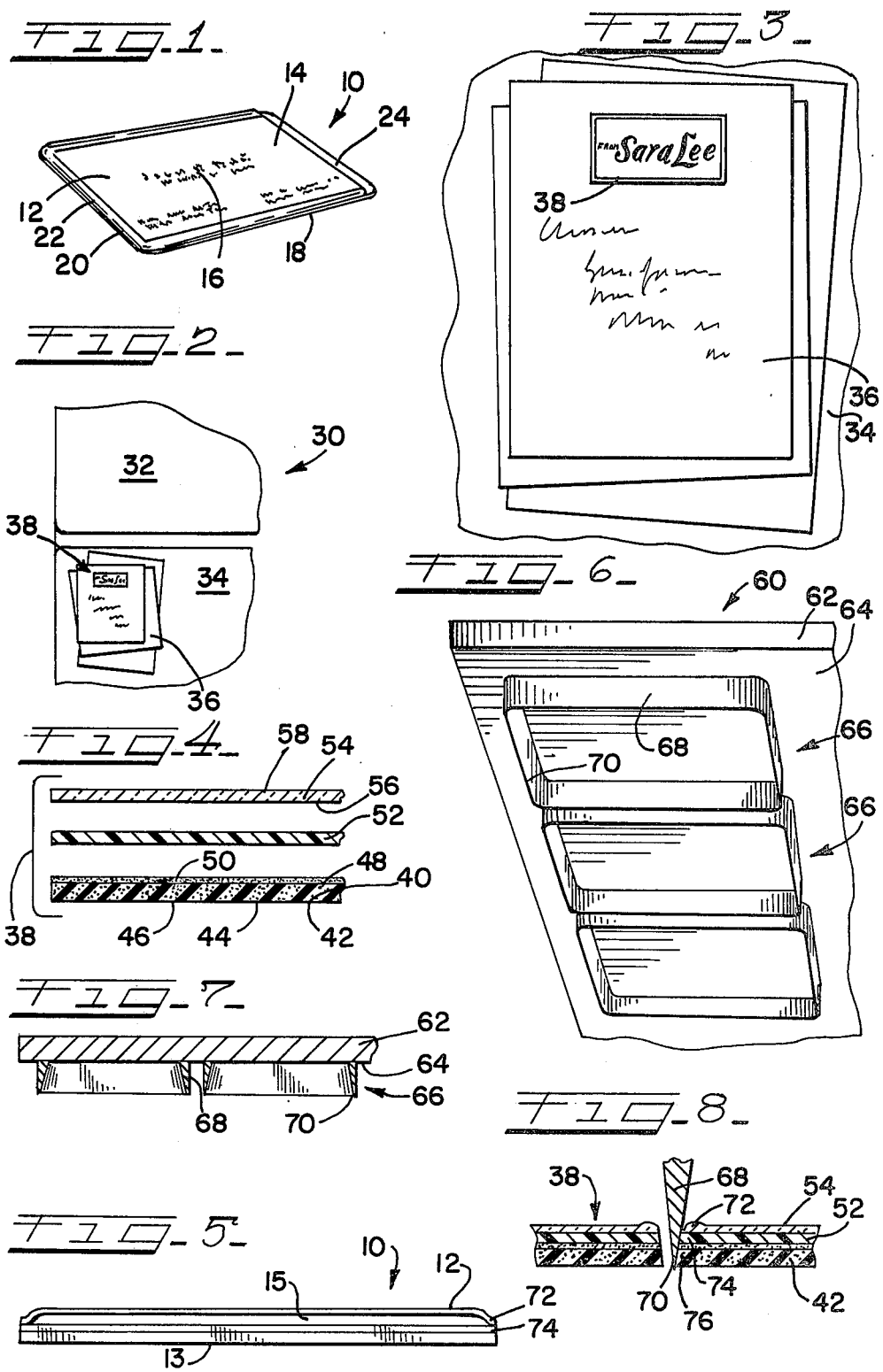

ADVERTISING AND PROMOTIONAL DISPLAY MATERIALS

The present invention relates generally to advertising and promotional materials, and more particularly to specialty articles using a flexible backing containing a magnetic material, in combination with an intermediate or bonding sheet and a printable, overlying plastic cover sheet, with such articles being cut, assembled, and in some cases decorated, in a novel manner.

The concept of temporarily securing materials to a display board or the like by magnetic means has long been known. For example, permanent magnets have commonly been used to hold papers or the like against a substrate material such as an inclined or vertically extending surface of an easel, cabinet door, or the like.

However, where simple metal magnets have been used, they have often abraded or discolored the surfaces on which they have been used. These units were often unsightly and sometimes cumbersome to use, and usually presented a distracting appearance in relation to the displayed materials.

More recently, an improvement was made when flexible magnetic strip materials were developed. These units consist essentially of an elastomeric material having dispersed therein a large plurality of small magnetic iron particles. This elastomeric material was less abrasive, and had several other characteristics which were recognized and taken advantage of. For example, articles having their own characteristic appearance can be made directly from these materials, and such articles can be used as a part of the desired appearance of the display itself. Commonly, the articles are either formed by molding and then decorated by silk screening, or are die cut to particular shapes and then silk screened. In either case, however, some disadvantages and limitations exist with products of this kind.

For example, where these magnetic articles are used in the kitchen or the like, there is a chance they will be encountered by small children who, because of the novelty of the articles, will be attracted to them and will chew on the decorative coating, which may contain pigments or vehicle not intended for human consumption. Such a situation obviously constitutes a health risk.

Moreover, because prior art articles were die cut and/or molded from a filled elastomer, they did not present the high quality visual image which is essential for successful use as an advertising medium or material. Moreover, they were inherently incapable of receiving and securing non-magnetic display materials thereover, although they could hold display material in place beneath them.

Because the magnetic material itself was an elastomer rather than a thermoplastic material, bonding thermoplastic materials to the magnetic material by heat sealing or the like was not thought possible. According to the present invention, however, the problem of bonding and assembly has been overcome, and articles can be made which possess numerous advantages and characteristics not heretofore available.

In keeping with the invention, it is possible to exploit the naturally attractive features and characteristics of flexible magnetic backing materials by using them in combination with other materials to form laminates which can be used for a number of purposes. In one case, an elastomeric body filled with particles of a magnetic material has adhered thereover an intermediate flexible thermoplastic sheet, held to the body by a pressure sensitive adhesive. A third or cover sheet, also made of a thermoplastic material, overlies the second sheet and is adhered thereto by a heat seal type bond formed between the outermost edges or margins of the cover sheet and the intermediate sheet.

If the display article thus made utilizes a transparent cover sheet overlying an opaque intermediate sheet, with marginal openings remaining, an envelope for removably receiving business cards, name tags, premium coupons, or the like can be made. If the sheets are laminated about their entire periphery, a display article or advertisement can be made, preferably by lithographing an impression on the inner or non-exposed surface of the cover sheet, with or without areas on the cover sheet allowing the intermediate sheet itself to be seen through the cover by the user.

Preferably, these products are made by performing a process which simultaneously die cuts the articles to shape, secures the members together temporarily while imparting pressure thereto, and which imparts a heat seal or fused type bond of very narrow width in the margins of the material. The various articles made according to the present invention include business card holders, coupon or premium holders and advertising message for household use, display advertising materials of all kinds, file cabinet tag holders, and other articles. Then construction, appearance and use are described herein.

An important feature of the invention is that the transparent cover sheet is made from a material on which a high quality lithographic print may be made so that, when the articles are used for advertising use, a high quality image is conveyed; according to the invention, protection for the printed material without sacrifice of its display characteristics is accomplished by printing it on the reverse side of the transparent or cover sheet. The cover sheet itself is bonded to the intermediate sheet only at their common edges and not along the facing parts of either sheet.

In view of the failure of the prior art to provide highly attractive, magnetically positionable, economical and safe display and related promotional materials, it is an object of the present invention to provide improved display articles having flexible magnetic bodies and high quality visual image for advertising and promotional use.

Another object is to provide a composite display material able to be manufactured readily at low cost in any number of attractive sizes and shapes.

Another object is to provide an article having a flexible magnetic backing and adapted to receive a high quality lithographed image thereon, which image will be protected against abrasion to normal use.

A still further object of the invention is to provide a novel assembly of laminated materials constructed and arranged to act as transparent or partially transparent envelopes, including envelopes having a portion of the reverse surface imprinted by a high quality lithographic or like printing process.

A still further object of the invention is to provide a novel method of assembling materials in such a way as to facilitate ready and economical manufacture of highly attractive, professional appearing promotional materials at low cost.

A still further object of the invention is to provide a display material having a flexible magnetic backing, an intermediate opaque laminating sheet and a transparent cover sheet bonded without the use of adhesives by a fused seal to a small margin of the intermediate sheet, and displaying a high quality print image contained on the inside surface of the transparent cover sheet.

Yet another object of the invention is to provide a display apparatus in which the object manufactured may be changed easily and at low cost, so that a variety of sizes and shapes can be prepared using substantially the same manufacturing equipment.

Another object is to provide a flexibly backed magnetic card or note holder or the like for display use which contains no coloring or other materials on any exterior surface thereof.

A still further object of the invention is to provide a novel method for assembling materials into a display unit having a flexible magnetic backing, a transparent top cover sheet and an intermediate bonding sheet.

A still further object of the invention is to provide a novel assembly method which includes forming a heat seal or other fused bond between a margin of the cover sheet and a margin of an intermediate adhesive sheet which in turn is laminated to an elastomeric backing material filled with magnetic particles.

The foregoing and other objects and advantages of the invention are achieved in practice by providing a display article having a flexible magnetic backing member comprising an elastomer filled with magnetic material, an intermediate sheet adhesively bonded to the backing member, and a cover sheet having its edges to the intermediate sheet along outer margin thereof, and in some cases, having the reverse side thereof imprinted with an image made by a high quality lithographic or like process.

The exact manner in which these and other objects and advantages of the invention are achieved in practice will become more clearly apparent when reference is made to the following detailed description of the preferred embodiments of the invention set forth by way of example, and to the accompanying drawings, wherein like reference numbers indicate corresponding parts throughout the several figures.

BRIEF DESCRIPTION OF THE DRAWINGS

FIG. 1 is a perspective view of one form of the display article of the invention, showing it to be used as an envelope with a transparent cover for receiving preprinted material;

FIG. 2 is a front elevational view with portions broken away showing a display article made according to the invention, associated with a refrigerator door and used to position a plurality of papers thereon in the manner of a bulletin board;

FIG. 3 is a fragmentary enlarged view showing the magnetic holder and papers shown in FIG. 2;

FIG. 4 is an exploded vertical sectional view showing the principal of the components of the invention in overlying relation before they are assembled into a completed display article;

FIG. 5 is an end elevational view of the envelope unit of FIG. 1, taken looking into the open end thereof;

FIG. 6 is a fragmentary perspective view of the die cutting and heat sealing apparatus used to manufacture articles made according to the invention;

FIG. 7 is a vertical sectional view of a portion of the cutting and sealing apparatus of FIG. 6; and FIG. 8 is an enlarged vertical sectional view showing the manner of forming the edge portions of articles made according to the invention.

DESCRIPTION OF THE PREFERRED
EMBODIMENTS OF THE INVENTION

While the principles of the invention may be carried into practice in making a number of articles, a description thereof will be made with respect to several embodiments which are used for advertising, display, promotional, or educational purposes.

It will further be understood that the variations in the exact constructions may be made, but the principal articles described will be in the one case those having a continuous seam or bond around the entire periphery thereof and the other article will be one in envelope form wherein the transparent cover sheet is intentionally bonded about the periphery of the backing materials so as to leave one or more open sides so that the object can be used as an envelope.

Referring now to the drawings in greater detail, FIG. 1 shows one form of the invention to be embodied in an envelope generally designated 10 and shown to have a transparent cover sheet 12 overlying a business card 14 disposed in the envelope 10 and shown to have printed indicia 16 thereon. According to the invention, the envelope unit 10 includes a flexible elastomeric magnetic body member 18 which is covered by an opaque thermoplastic sheet 20, disposed intermediate the magnetic body 18 and the cover sheet 12. The intermediate sheet 20 and the cover sheet 12 are bonded to each other along three sides of their common edges 22, while being unbonded to each other along a front side 24 thereof. Since the intermediate and cover sheets 20, 12 are not bonded to each other, an opening is provided for inserting the card 14 or other desired object. A more detailed description of the envelope unit of FIG. 1 will be made in connection with a description of the process of making it.

According to the invention, the envelope unit 10 contains the card 14 or other material may then be secured to any ferrous metal backing material for a suitable purpose, such as identifying a display, identifying a file cabinet, or for other advertising or promotional purpose.

Referring now to FIGS. 2 and 3, the invention is shown to be embodied in a predecorated advertising or promotional paper holder 38 used to removably receive and hold papers, coupons, messages, or the like, in place against a vertical surface of an appliance or the like. In this case, a kitchen appliance such as a refrigerator or the like 30 has an upper door 32 and a lower door 34, and used as a bulletin board on which several papers 36 are removably supported by the holder 38.

As shown in FIG. 3, the advertising display type paper holder 38 typically, although not necessarily, may be a rectangular magnetic laminated display article whose exact construction features will be described in detail later, but which will be seen to include an outwardly facing front surface portion displaying a well known trademark and suitable for use in an advertising promotion. As illustrated, a housewife may place messages, recipes, food advertisements, reminders, advertising circulars or the like in a convenient location, such as on a refrigerator door by the use of the attractive display type holder 38.

Because of its flexible backing, the article 38 may be attached to flat or contoured surfaces, and will not abrade or discolor a surface with which it is associated, even when there are no articles between the holder 38 and the metallic substrate therebeneath. Consequently, the holder may remain in position on the appliance door whether or not there are papers, coupons, or the like therebeneath. At any rate, when used as a promotional piece, the holder serves to remind the consumer of the brand name of the product which it is promoting, while at the same time serving a desirable purpose of convenience for the household.

According to the invention, the advertising image presented by the display article or holder 38 is one of high quality, because the image presented comprises a high quality lithographic print made on the inside surface of a transparent thermoplastic cover sheet. In this way, the image is not abraded in use, and the materials forming the image are protected against accidental ingestion by children or the like. As will appear, various decorating possibilities which are highly desirably in advertising or promotion are made possible by reason of the present invention.

Referring now to FIG. 4, the manner in which the components of the invention are assembled is illustrated. As shown in FIG. 4, the magnetic body element 40 of the holder 38 comprises an elastomeric sheet 42 having a plurality of magnetic particles 44 of very small size uniformly dispersed therein. Such material is commercially available from known suppliers, such as the BF Goodrich Company of Akron, Ohio. The body element 40 includes a rear or attachment surface portion 46 and a front or bonding surface portion 48, with the front surface portion being shown to be covered by a layer 50 of a pressure-sensitive adhesive containing a tacky rubber or rubber-like constituent. An intermediate or bonding sheet 52 overlies the adhesive layer 50 which in turn overlies the front surface 48 of the sheet 42. The thermoplastic sheet 52 is overprinted or filled with pigments so as to render it opaque, hiding or covering the dark brown or black, unsightly appearance of the magnetic sheet 42. Overlying the intermediate or bonding sheet 52 is a transparent thermoplastic cover sheet 54 having an inner or protected surface 56 as well as an outer or top surface 58. According to the invention, the cover sheet 54 is made from a thermoplastic material such as a lithographing grade polyvinyl chloride, and preferably has a high quality lithographic image printed on the inner surface 56 thereof, for reasons appearing elsewhere herein.

Referring now to the manner of assembling the holder, envelopes or other magnetic display articles made in accordance with the invention, reference is made to FIGS. 6-8. FIG. 6 shows a preferred form of apparatus used in making the articles, namely, a combination die cutting and heat sealing apparatus generally designated 60, having a rigid platen 62 with a lower surface 64, to which are affixed a plurality of die cutting knives or blades generally designated 66 and shown to comprise sidewall portions 68 and sharpened lower edges 70. FIG. 7 shows that the sidewalls 68 are of a tapering configuration terminating in the sharpened edges 70 just referred to. The knives or blades 66 are preferably made from a tough sharpenable material such as tool steel. The platen 62 may be made from metal, wood, or a synthetic material and is adapted to be received within a press which can exert a downward pressure on the associated platen 62.

Referring now to the method of the invention, a sheet of the elastomeric material 42 is covered with a layer 50 of pressure sensitive adhesive in a first operation, after which the opaque intermediate or bonding sheet 52 is placed thereover; these sheets are then laminated together by applying pressure thereto.

Thereafter, the clear or decorated cover sheet material 58 is placed over the three-element laminate, and the four-element unit comprising the elastomer filled with magnetic materials, the adhesive, the intermediate and the cover sheet are placed as a unit, beneath the die cutter and bonding unit.

Next, the die is pressed downwardly while being subjected to ultrasonic or other very high frequency vibration. The manner of vibrating the die unit and the exact frequency thereof is not a critical part of the invention, inasmuch as commerical units are known to those skilled in the art to be available for this purpose. Such units include those known as "Thermasonic" bonding units.

As shown in FIG. 8, when downward pressure is applied, the knife edge 70 on the die cutter unit 66 serves to cut through all of the sheets of material as well as the adhesive. At the same time, the ultrasonic energy which is supplied to the blades 68 of the die 66 causes an incipient melting or sintering of the edge portions 72, 74 of the cover and intermediate sheet respectively. As the die is lowered and the die cut is completed, the two margins 72, 74 of the sheets 52, 54 are permanently fused or bonded to each other, while the margin 74 of the intermediate sheet remains bonded to the margin 76 as well as the remainder of the front surface of the elastomeric sheet 42.

In the prior art, it was believed that, because of the elastomeric nature of the rubber backing material, it was not possible to laminate plural sheets of thermoplastic material to it. At the same time, the concept of professional quality display articles made from these material was not considered feasible because the elastomeric sheet or body which was necessary to provide magnetic attraction was unsightly and not suitable for display unless covered with a silk screened or other surface imprinted coating. The rubber substrate itself is not suitable for receiving a high quality image and, even if it were, such image would leave exposed printed materials on the surface.

After the die has cut the sheets and the applied ultrasonic energy has completed the seal, about some or all of the margins of the two sheets, all of which is accomplished in a matter of a few seconds or less, the platen 62 is raised and the sheets of laminate materials have been formed into a plurality of holders, other display units or envelopes of the type just described.

Referring now to FIG. 5, an enlarged view of the envelope 10 of FIG. 1 is shown. As is shown, the outer edges 72, 74 of the cover sheet 12 and the intermediate sheet 20 are shown bonded to each other, with an open area 15 lying therebetween. The lower surface 13 of the magnetic sheet 18 faces the appliance door, cabinet drawer, or the like for mounting. The envelope 10 is suitable for any number of uses.

For example, in one embodiment, such as that shown in FIG. 1, a business card may be received therein. In addition, various filing cards, indexing cards or other indicia may be placed therein and these may be removed or rearranged readily on file cabinets, drawers, or used for other classification purposes. In another embodiment, the envelope 10 may be used as a promotional device for specialized domestic uses such as for a premium coupon holder. In this case, an envelope is made available to the consumer which will attach to a refrigerator or cabinet. The entire inter-sheet area 15 may be used to store premium coupons, while a portion or all of the inner surface 17 of the cover sheet 14 may bear a trademark or imprint of the sponsoring manufacturer.

Consequently, each time the housewife or other consumer inserts coupons in the holder, such person will invariably see the trademark or other image of the promoter or sponser of the commercial product. Because of the convenience associated with such devices, they create a highly favorable association between the often seen trademark or brand name and the product being promoted. This is often further reinforced by seeing premium coupons or the like which may be used to obtain discounts or partial price refunds on various products, and accordingly, further trade identity reinforcement is possible. In view of this situation, manufacturers are eager to encourage brand loyalty and find such advertising and promotional articles highly attractive, especially in view of their low price and relatively long life in use by the consumer.

Referring now to the matter of the quality image which is able to be presented with these units in contrast to the lower quality image associated with prior art advertising and promotional displays, and referring particular to FIG. 4, the intermediate sheet 52 is preferably made from a sheet of a white polyvinyl chloride material. This vinyl may be used as the backing to create a reversed out printing effect in relation to the material lithographed on the inner surface 56 of the sheet 54. In other words, when the inner surface 54 is covered with any opaque covering such as a colored ink or the like, this will be seen through the transparent cover sheet 54. However, where there are unprinted areas, the color of the sheet 52 will be seen and taken visually as another color comprising the printed matter. This both simplifies making the product and increases its visual impact.

Merely by way of example, other products which can be made using the method of the invention include not only the magnetic article holders of all forms used for advertising purposes, but also key fobs, or other novelty items wherein temporary, removable positioning is important, movable display articles or pieces used as elements of flow charts, puzzles, or other graphic displays, articles used to illustrate changes of sequence, exploded views or the like used in teaching presentations of all kinds, etc.

Because articles made according to the invention take on almost any shape, great versatility is inherently present in both the method and the articles themselves, making them further attractive to advertisers and promoters. The formation of an adhesiveless fused bond of narrow cross-section, forming a very small margin about the periphery of the article is highly advantageous from a visual standpoint, inasmuch as there are no distracting color or texture changes about a wide margin near the edges of the articles.

In most articles made according to the invention, the magnetic body, the intermediate sheet and the cover sheet are identical in shape and thus present an identical plan view when resting on a horizontal surface; it is possible for articles to be made wherein the cover sheet or an additional sheet, is of smaller area than the intermediate sheet and of the body portion. Such article may be desirable, for example, where it is desired to make a relatively large envelope for receiving premium coupons, or the like, such as with the envelope in turn possibly being covered by a still further sheet which is attached thereto by the fused or heat seal type of bond described above. In such case, the three sheets and the adhesive are formed into an envelope, and a fourth sheet which is, in effect, a second cover sheet, is adhered to only a portion of the first cover sheet, with the lithographed impression being imprinted on the reverse or inwardly facing side of the second sheet. Typically, the lithographing would comprise a logotype, picture or slogan or other message from an advertiser or sponsor of the commercial product being promoted.

It will thus be seen that the present invention provides various magnetically positionable articles and methods of making them including these pointed out above and others which are inherent in the invention. Such articles and methods of the invention have been described by way of illustration, it is anticipated that changes and modifications of the described magnetically positionable articles and methods will occur to those skilled in the art and that such changes and modifications may be made without departing from the spirit of the invention or the scope of the appended claims.

I claim:

1. An article for displaying advertising or the like, said article comprising, in combination, a mounting portion including a body of an elastomeric material having embedded therein a plurality of magnetic particles, thereby rendering said mounting portion capable of being adhered to a magnetically permeable substrate, said body having a continuous rear surface portion adapted to be received over said substrate, an oppositely directed front surface portion, and sidewall portions extending between and joining said front and rear surfaces to each other, an intermediate opaque sheet of a thermoplastic material bonded by a pressure-sensitive adhesive to said front surface portion of said body, and a cover sheet closely overlying said intermediate sheet, said intermediate sheet and said cover sheet also having respective oppositely directed non-adherent surfaces and outer outer edges formed by sidewalls coextensive with and aligned in overlying relation to said sidewalls of said mounting portion, whereby all of said sidewalls define the shape of said article, said sidewalls of said intermediate and cover sheets being bonded to each other by a fused, adhesiveless bond joining said intermediate and cover sheet sidewalls only and extending about at least a substantial portion of the periphery of said article, said cover and intermediate sheets being thereby substantially free from a visible bond lying within the outer margin of said sheets.

2. An article as defined in claim 1 wherein said adhesiveless bond extends entirely around said periphery of said article.

3. An article as defined in claim 1 wherein said cover sheet includes a display image printed on the surface of said cover sheet which is directed toward said body portion, said printed display image being thereby protected against abrasion.

4. An article as defined in claim 1 wherein said article comprises an envelope having four sides and wherein said adhesiveless bond extends around three sides of said article, said fourth side being free from said bond, whereby an opening between said intermediate and cover sheets is provided for inserting a display object.

5. An article as defined in claim 1 wherein said intermediate and cover sheets are made from polyvinyl chloride.

6. An article as defined in claim 1 wherein said cover sheet is transparent.

7. A method of manufacturing a display article, said method including the steps of adhesively securing a first sheet of an opaque thermoplastic material to one surface of a backing material in the form of a sheet of an elastomer having a plurality of magnetic particles dispersed throughout said sheet, placing a second sheet of transparent thermoplastic film having inner and outer surfaces over said backing and said first sheet to create an array of superimposed sheets, with the inner surface of said second sheet being adapted to receive a printed impression thereon, and placing a knife edge type die which is capable of receiving high frequency vibrational energy and transferring at least a part of said energy to an article contacted by said die over said array of superimposed sheets and substantially simultaneously die cutting said array of superimposed sheets into a plurality of articles, the outer edges of which have a shape determined by the shape of said die and applying vibrational energy to said die for transmission to said sheets so as to fuse the outer sidewall portions of said first and second sheets to each other, thereby providing a display article having die cut sidewalls and a magnetic backing member covered by first and second superimposed sheets, said superimposed sheets having their sidewalls bonded to each other, said article having an outer margin free from a visible adhesive bond of substantial width.

* * * * *

UNITED STATES PATENT AND TRADEMARK OFFICE
CERTIFICATE OF CORRECTION

PATENT NO. : 4,310,978
DATED : January 19, 1982
INVENTOR(S) : Larry Stern

It is certified that error appears in the above—identified patent and that said Letters Patent is hereby corrected as shown below:

Column 2, line 54, delete the word "to" and in place thereof, please insert the word -- in --.

Signed and Sealed this

Twenty-second Day of June 1982

[SEAL]

Attest:

GERALD J. MOSSINGHOFF

*Attesting Officer*     *Commissioner of Patents and Trademarks*